United States Patent Office 3,424,820
Patented Jan. 28, 1969

3,424,820
GRAFT COPOLYMERS OF AMINE COMPOUNDS ON POLYAMIDE AND POLYESTER SUBSTRATES
Eugene Edward Magat, Spring Valley, Wilmington, Del., and David Tanner, Charlottesville, Va., assignors to E. I. du Pont de Nemours and Company, Wilmington, Del., a corporation of Delaware
No Drawing. Continuation-in-part of application Ser. No. 578,414, Sept. 9, 1966. This application Dec. 21, 1966, Ser. No. 603,411
U.S. Cl. 260—857
Int. Cl. C08g 20/38, 17/14
5 Claims

ABSTRACT OF THE DISCLOSURE

A graft copolymer comprising a polyamide or polyester substrate having grafted thereto a basic amine compound gives improved dyeability, reduced static propensity, is more wickable, and gives increased resistance to soiling.

---

This application is a continuation-in-part of application Ser. No. 578,414, filed Sept. 9, 1866, which is a continuation of application Ser. No. 863,047, filed Dec. 30, 1959, now abandoned, which is a division of application Ser. No. 735,288, filed May 14, 1958, now U.S. Patent 3,188,228, which is a continuation-in-part of our abandoned applications Ser. No. 499,754, filed Apr. 6, 1955, now abandoned, and Ser. No. 503,790, filed Apr. 25, 1955, now abandoned.

This invention is concerned with fibers from grafted synthetic polymeric esters and amides.

Graft copolymers have been developed for many end-uses. Grafted synthetic linear condensation polymers have been studied less extensively than the addition polymers, since the latter are especially adapted to grafting reactions requiring free radial activity, which may be present as a result of the polymerization process, or may be induced by activating residual unsaturated (double) bonds.

The use of ionizing radiation to initiate grafting to condensation polymers is described and claimed by Magat and Tanner in U.S. Patent 3,188,228. By means of these grafts, properties not normally found in condensation polymers may be provided. For example, increased reactivity, improved static resistance, resistance to hole melting and the like can be attained without significant loss in the properties of the substrate polymer.

In accordance with the present invention an acid-dyeable shaped article is prepared comprising (a) a synthetic linear condensation polymer of polyamide or polyester, bearing (b) grafted side chains chemically bonded to the trunk of the said condensation polymer, the said side chains bearing from about 45 to 3000 equivalents of basic nitrogen per $10^6$ gms. of substrate polymer.

The polyamide which serves as a substrate for grafting is a fiber-forming polyamide wherein the amide linkage is an integral part of the polyamide chain. Similarly, the polyesters are those wherein the ester linkage is an integral part of the polymer chain. The grafted polymer chains are bonded by carbon-carbon linkages to the substrate polymer backbone.

The preferred method for producing the product is to graft vinyl pyridine to the substrate polymer; the amine may then be quaternized, if desired. When using ionizing radiation, it is not even necessary to use an unsaturated amine since saturated compounds may be activated to bond to the polymer, although with lower radiation efficiency. However, in order to attain the maximum amount of grafting with the minimum radiation dose, unsaturated compounds are preferred, particularly those with vinyl unsaturation. Vinyl pyridine is especially preferred to produce the graft copolymer of this invention since it is sufficiently heat-stable so that it may be grafted to polyamide flake, and thereafter be melt-spun in the conventional manner. Other preferred amines are those which are sufficiently heat stable so that they do not cause excessive yellowing when the fabric is subjected to heat-setting conditions. The preferred modifiers are those nitrogenous organic bases, containing carbon-carbon unsaturation either isolated or conjugated with a carbonyl function, and which bear amine groups in either of the following configurations: (A) primary amine groups, with no hydrogen atoms on the carbon adjacent to nitrogen, and (B) tertiary amine groups with no hydrogen atoms on the carbon atoms beta to the tertiary nitrogen.

In order to effectively improve the dyeability of condensation polymer fabrics, it is desirable to graft a minimum of 45 to 50 equivalents of amine per million grams of polymer; it is preferred, however, to graft 120 to 3000 equivalents. Most satisfactory results are obtained when the amines penetrate throughout the entire thickness of the fiber; thus, deep shades are obtainable, and there is no danger of color change as the fabric wears, such as occurs when merely surface dyeing is obtained. As a minimum, the dye should penetrate at least 10% along the radius in two denier per filament yarn (e.g., a distance of 0.8 micron in a yarn of 16 microns diameter). The same minimum distance (i.e., 0.8 micron) is adequate on yarns of higher denier per filament.

It is apparent, of course, that the concentration requirements specified above refer to the polymer volume which has been penetrated by the amine. The depth of penetration is readily determined by microscopic examination of a grafted, acid-dyed fiber cross-section.

Grafting is most conveniently initiated by high energy radiation, such as high energy electrons, X- or gamma-rays. The polymer substrate may be soaked in the modifier either as a liquid or as a solution and the combination irradiated in a single step operation. Alternatively, the polymer substrate may be irradiated at room temperature and then preferably immediately, contacted with the modifier in a two-step process. A preferred embodiment of the two step process is to irradiate the polymer below 10° C., preferably below 0° C. and then contact it with the modifier. Grafting occurs as the combination is warmed.

The polymer substrate may be grafted in the form of flake, by presoaking it in the solution so that sufficient modifier is absorbed to reach the desired weight level. The combination is then irradiated to induce grafting, after which the flake is washed, dried and spun to yarn. Alternatively, fiber or fabric may be treated after it has been spun or woven. This type treatment will usually result in a shorter soaking time due to the smaller dimensions of the substrate polymer. Flake treatment will usually give a greater thruput, promoting efficient use of radiation.

The invention is illustrated by the following examples but it is not limited thereby. Unless otherwise indicated, weight percentages are intended. Irradiation doses are given mrad where 1 mrad is equal to 1,000,000 rad.

EXAMPLE 1

One swatch of "66" nylon (polyhexamethylene adipamide) fabric (Sample 1A) is immersed in a solution of 50 parts hexamethylene diamine and 50 parts water. A second sample of this same fabric (Sample 1B) is immersed in liquid bis(3-aminopropoxy)-ethane. After removal of excess liquid by wringing, but while still wet, they are enclosed in an aluminum foil wrapper and subjected to electron irradiation, using a 1 mev. resonant transformer as a source of radiation. The beam-out current is 560 microamperes, which gives a dose of 5.6 mrad per pass as the sample is conveyed under the beam. A total dose of 33 mrad is employed. An untreated control (1C) is similarly irradiated. Each sample is subjected to 15 standard washings using household detergent and hot tap water. Separate 10 gram portions of each of the samples are then dyed competitively with an acid dye and with a basic dye for one hour at a temperature between 95–100° C., with the results given in Table 1.

Acid dye bath composition: Gram
   Du Pont Milling Red 3B dye (C.I. #430) ___ 0.05
   Octyl phenyl polyether alcohol [1] _____ 0.2
   Ammonium acetate buffer _____ 0.5
   Distilled water _____ 484.0

Basic dye bath composition:
   Du Pont Brillant Green crystals (C. I. #662) 0.1
   Octyl phenyl polyether alcohol [1] _____ 0.2
   Distilled water _____ 500.0

[1] A wetting agent sold by the Rohm & Haas Company of Philadelphia, Pa., under the name of "Triton" X-100.

TABLE 1

| Sample | Acid Dye (red) | Basic Dye (green) |
|---|---|---|
| 1A | Much darker than control | Much lighter than control. |
| 1B | Darker than control | Do. |

The control, Sample 1C, shows only slight change in its dyeability over a swatch of the original, non-irradiated and uncoated fabric. Cross sections of the acid-dyed filaments of Sample 1A show uniform dyeing throughout, proving that the diamine completely pentrated the fiber before grafting.

Analysis of undyed portions of Samples 1A and 1B showed that they had respectively, 106 and 51.8 equivalents of grafted amine groups per $10^6$ gm. nylon.

EXAMPLE 2

A sample of fabric woven from continuous filament polyethylene terephthalate is immersed in liquid bis(3-aminopropoxy) ethane and thereafter irradiated in the equipment and in accordance with the technique of Example 1 to a total dosage of 33 mrad. The coated sample, an uncoated, irradiated comparative control and a swatch of the original fabric are subjected to 15 standard washings. They are thereafter immersed for one hour at 95°–100° C. in the acid dye bath of Example 1. After thorough rinsing, it is observed that neither of the comparative control samples is affected by the dye. The coated, irradiated fabric dyes a bright red. A microscopic examination of the cross section of dyed fibers discloses that they are "ring dyed."

EXAMPLE 3

Nylon taffeta samples are soaked in a solution of 15 ml. of methanol and 15 ml. of 4-vinylpyridine, under the conditions shown in Table 2. Following the soaking, each sample is packaged in a polyethylene bag and is irradiated at the soaking temperature using 2 mev. electrons, with the dose shown. Each sample is washed four times in distilled water at 80° C. and the weight gain (Table 2) is determined upon the dried fabric.

TABLE 2

| Sample No. | Soaking Temp., (°C.) | Soaking time min. | Dose, mrad | Wt. gain, percent |
|---|---|---|---|---|
| 2A | 25 | 120 | 1 | 2.2 |
| 2B | 60–65 | 20 | 1 | 16.0 |
| 2C | 60–65 | 20 | 2 | 27.0 |

Sample 2C, having grafted pyridine groups, is heated at the boil for ½ hour in a solution containing two drops of concentrated sulfuric acid in 100 ml. of water. The resulting fabric is highly wickable, and has a log R [2] value at 55% of 8.5. The wet crease recovery is markedly improved in comparison with an unmodified control fabric.

Other amines are readily grafted to condensation polymer substrates, such as for example, allylamine, vinylamine, diaminooctadiene, N,N-diallylmelamine and the like. When N,N-diallylmelamine is grafted to polyamide fabric, followed by cross-linking with aqueous formaldehyde, a fabric with increased resilience and resistance to hole melting is produced.

EXAMPLE 4

This example illustrates the use of amines which are preferred because they are stable to nylon heat-setting conditions.

Nylon taffeta samples are soaked for 20 hours in a solution containing 0.54 gram of the preferred amine, 0.25 gram of acetic acid and 1.6 ml. of water per gram of fabric. After soaking, the wet fabrics are wrapped in aluminum foil and irradiated with a dose of 5 mrad using 2 mev. electrons. The samples are then washed at 60° C. with household detergent for one hour, rinsed once at 60° C. for one hour, and twice at room temperature for 10 minutes. After drying for five minutes at 90° C. the samples are weighed to determine the weight changes accompanying grafting.

The fabric samples are dyed by boiling for one hour in a solution consisting of 50 ml. of water, 0.1 g. of dye, and 5 ml. of 10% aqueous potassium acid phthalate solution per gram of fabric. The dyed samples are then washed for 15 minutes in household detergent solution at 60° C., rinsed twice with distilled water, and dried by heating to 90° C. in a forced air oven for five minutes.

The amount of dye taken up by each sample of saturation dyed fabric is determined by dissolving a weighed sample of the fabric in formic acid, and measuring the optical density of the solution at a wave length appropriate to the dye used; in this case, the wave length is 330 m. for Anthraquinone Blue GA (C. I. Acid Blue 58) dye. Quantitative results are obtained by comparison with standard solutions of the dye. The values obtained, along with the number of amine ends grafted are indicated in Table 3. For purposes of comparison, an unmodified, unirradiated control nylon has a dye uptake of 1.90%.

TABLE 3

| Sample No. | Compound grafted | Amine ends introduced/$10^6$ gm. | Dye uptake, percent |
|---|---|---|---|
| 4A | 3,3 dimethyl-4-dimethyl-amino-1-butene. | 59.5 | 4.15 |
| 4B | 2,2 dimethyl-3-dimethyl-aminopropyl acrylate. | 55.6 | 3.95 |
| 4C | N-acrylyl tetramethylene diamine. | 47.2 | 3.09 |
| 4D | N, diacrylyl tetramethylene diamine. | 45.1 | 3.15 |
| 4E | N-(2,2-dimethyl-3-dimethyl-aminopropyl)acrylamide. | [1] 311.00 | 3.49 |

[1] Excess homopolymer not removed by scour, but removed in acidic dye bath.

EXAMPLE 5

Nylon samples with grafted 4-vinylpyridine are prepared, following the procedure of Example 3. Samples 5A

[2] The static propensity of the fabric is indicated in terms of direct current resistance in ohms per square, measured parallel to the fabric surface, at 78° F. in a 50% relative humidity atmosphere. High values, reported as the logarithm (to the base 10) of the resistivity (log R) indicate a tendency to acquire and retain a static charge. It should be noted that highly hydrophobic unmodified polymer substrates have such a high resistivity that the log R determined may depend somewhat on the sensitivity of the meter employed; log R values of 13 to over 15 have been observed, using the same fabric and different meters. However, these differences substantially disappear when a satisfactory antistatic modification is produced, e.g., for log R values of 11 or less. Moreover, data reported in any given example are consistent, i.e., all measurements were made on the same instruments under the same conditions. A meter suitable for this determination is described by Hayek and Chromey, American Dyestuff Reporter, 40, 225 (1951).

and 5B have a weight gain, due to grafted 4-vinylpyridine, of 20%.

The polyvinylpyridine graft is quaternized by heating the fabric samples at reflux in 500 ml. of methanol and 50 grams of butyl bromide for 15 hours. The fabric samples are washed twice in hot methanol and once in water at 80° C. to remove any free butyl bromide and methanol. The weight gain after quaternization indicates that approximately 55% of the available pyridine groups have been quaternized. A control sample, 5C, not grafted with 4-vinylpyridine, is subjected to the butyl bromide treatment. In addition, a control sample entirely untreated, number 5D, is subjected to the test. The samples are identified in Table 4.

Table 4

| Sample No.: | Sample identification |
|---|---|
| 5A | Nylon with grafted 4 - vinyl-pyridine (4VP), quaternized with butyl bromide. |
| 5B | Nylon with grafted 4VP, not quaternized. |
| 5C | Control nylon treated with butyl bromide. |
| 5D | Control nylon, untreated. |

Portions of these samples are tested for biological activity against a *Micrococcus pyogenes* baterium. Following the procedure described below, it is found that the grafted, quaternized sample, 5A, inhibits bacterial growth in 12 of the 16 samples tested, whereas no inhibition is noted with the various control samples, 5B, C and D. The results of the tests are listed in Table 5.

TABLE 5.—BACTERICIDE TESTS

| Sample No. | Inhibitory | Noninhibitory | Questionable results | Total sample tested |
|---|---|---|---|---|
| 5A | 12 | 4 | 0 | 16 |
| 5B | 0 | 7 | 1 | 8 |
| 5C | 0 | 16 | 0 | 16 |
| 5D | 0 | 14 | 0 | 14 |

It is noted that the inhibitory effects of the active graft (Sample 5A) are confined to the fabric itself. Growth occurs around the edges of the fabric, indicating that the active species does not diffuse, but remains attached to the fabric substrate.

The following procedure is used to test the fabric samples: 0.05 ml. of nutrient broth, containing a 1:10 dilution of *Micrococcus pyogenes* var. Aureus and 0.1% 2,3,5-triphenyl-2H-tetrazolium chloride, is pipetted to strips of fabric 1 x 2.5 cm. The tetrazolium chloride is added as an indicator of bacterial growth, since it is colorless in the oxidized state, but as the bacteria grow, it is reduced and becomes red. Control samples (nutrient broth and tetrazolium chloride, but no bacteria) are also tested. After the broth dilutions are pipetted to the fabric samples, the samples are placed on sterile nutrient agar plates. Both "sterile" (boiled in methanol) and non-sterile nylon samples are tested. All plates are incubated at 37° C. for 16 and 18 hours, after which they are examined for bacterial growth on the fabric.

When growth is observed on the fabric, the result is recorded as "non-inhibitory." When no growth on the fabric is observed, the result is recorded as "inhibitory."

This example shows that by the process of this invention, bactericidal compounds may be permanently attached to fabric substrates. This is most surprising, since it has always been thought that a bactericide to be effective must be somewhat soluble in liquid media. The modification produced by the process of this invention, however, remains permanently attached to the fabric, so that it is retained permanently for the life of the fabric, through washing and wearing.

EXAMPLE 6

Fifty grams of 66 nylon flake, ground to pass 25 mesh screen, is sealed in a polyethylene bag with a solution containing 50 ml. 4-vinyl pyridine, 50 ml. $H_2O$ and 50 ml. of methanol. After soaking for 24 hours, the sample is irridiated under a 2 mev. electron beam to a dosage of 5 mrad. After irradiation, the sample is left to soak for 60 hours and then is extracted with methanol, using a Soxhlet extractor, for 24 hrs. After drying, the flake is found to contain 13.6% polyvinylpyridine grafted to the nylon. This flake was melt spun and drawn to give a yarn that had a tenacity of 4.0 g.p.d., elongation of 34%, and an initial modulus of 40 g.p.d.

A filling face satin fabric made from this yarn dyes several shades deeper with acid and premetallized dyes that control. When subjected to standard tests for oily and dry soil, it is superior to unmodified 66 nylon, and almost equivalent to cotton.

When quaternized by boiling for 3 hours in a 2% solution of methyl iodide in methanol, the fabric has a log R of 12.3 vs. 15.1 for untreated control.

EXAMPLE 7

66 nylon flake which was ground to pass a 25 mesh screen is irradiated to a dose of 3 mrad using an electron accelerator operated as in Example 1. Following the irradiation, the polymer is immediately immersed in a solution consisting of equal volumes of 4-vinylpyridine, water and methanol. After a soaking for 24 hours, at room temperature, the flake is removed, washed and dried. A weight gain of 39.0% is observed. The flake is diluted with unmodified flake to contain 10% grafted PVP. The diluted flake is melt spun, drawn and woven into a filling face satin. The fabric has improved resistance to dry and oily soiling. When quaternized by boiling in dimethyl sulfate in benzene, the log R is 11.8 as compared to a value of 16.2 for unmodified control.

The procedure of this example is repeated using polymer flake from the polyamide prepared from bis (4-amino-cyclohexyl)methane and dodecandioic acid. The monomer employed for Test A is 4-vinylpyridine and that for Test B is 2-vinyl-pyridine. Weight gains of 13.1 and 4.1% respectively are obtained with an irradiation dose of 5 mrad. The grafted flake is readily melt spun and drawn to make a colorless yarn. A test of dye uptake showed that the 4-vinylpyridine graft A dyes readily with acid dyes, giving a 99% dye uptake as compared to 1% for an unmodified control. Fabric of a second sample, with 19.1% grafted 4-vinylpyridine, is subjected to the Wagg oily soiling test; it showed a reflectance after a second washing of 75.4% as compared to 62.7% for an unmodified control.

EXAMPLE 8

A swatch of 66 nylon fabric is swollen by soaking in methanol, followed by soaking for 2 hours in a warm (60° C.) solution of 20% N,N-diallylmelamine in methanol. The fabric is wrung out, enclosed in aluminum foil while still wet, and irradiated to a dose to 40 mrad. The weight gain due to grafted N,N-diallylmelamine is 4.4%. The melamine graft is cured by soaking in a 37% solution of formaldehyde containing 1% maleic acid, followed by heating for 5 minutes at 140° C. Although the fabric is washed repeatedly in hot distilled water, excellent static protection is observed, as shown by a constant log R of 9.8.

Useful modifiers.—The modifiers useful in producing the grafted product of this are basic amines such as methylamine, ethylamine, hexamethylene diamine and dodecylamine as well as those previously mentioned. Although saturated amines may be employed, it is preferred that at least one ethylenically unsaturated linkage be present. Suitable unsaturated amines of this type include vinyl pyridine, allyl amine, diallyl amine, vinyloxyethylamine, 3,3-dimethyl-4-dimethylamine-1-butene, N,N-diacryltetramethylene diamine, N,N-diallyl melamine, diamino octadiene. The amines may be quaternized before or after grafting. Suitable quaternary amines include tetraallyl ammonium bromide, vinyl trimethyl ammonium iodide, and the methiodide of methylene-3-aminomethylcyclobutane. If desired, amines with acetylenic unsaturation may be grafted to produce the product of this invention.

Due to their thermal stability, the modifiers preferred for producing the product of this invention are the vinyl pyridines and their lower alkyl substituted derivatives, 2-vinylpyridine, 4-vinylpyridine, N-vinylpyridine, and the corresponding picolines, lutidines and collidenes. The vinyl substituted piperidines and piperazines and their lower alkyl substituted derivatives may also be employed.

It is within the scope of this invention to employ multifunctional unsaturated modifiers to produce some additional effect such as improved crease recovery, flame resistance, improved hand, and the like, as long as the specified concentration of grafted amine groups is also present.

Method of application.—The substrate polymer may be contacted with the modifier composition before or after irradiation, as already stated. It may be applied to the fiber as a liquid or vapor, or may be applied as a solution or an emulsion. Since some penetration of the composition into the polymer is usually beneficial, especially to improve dyeability of the product in its final (fiber) shape, choosing a solvent having a swelling effect on the substrate will increase the rate of diffusion. Pre-soaking in the modifier solution before irradiating will also enhance penetration. Alternatively, the polymer may be pre-swollen with swelling agent before contacting with the modifier composition. When contacting pre-irradiated substrate polymer, it is usually helpful to heat the modifier composition to accelerate the reaction. This is especially helpful with polyethylene terephthalate, which grafts best at temperatures above 80° C. In general, however, temperatures of 50 to 150° C. are satisfactory.

It will often be desirable to soak and/or irradiate filaments under sufficient tension to keep them from shrinking. This will help maintain maximum fiber orientation.

Irradiation conditions.—By "ionizing radiation" is meant radiation having sufficient energy to remove an electron from a gas atom, forming an ion pair; this requires an energy of about 32 electron volts (e.v.) for each ion pair formed. This radiation has sufficient energy to non-selectively break chemical bonds; thus, in round numbers radiation with energy of 50 electron volts (e.v.) and above is effective for the process of this invention, although energies of 50,000 e.v. and over are preferred. Both particle radiation and ionizing electromagnetic radiation are included.

The preferred radiation for the practice of this invention is high energy ionizing particle radiation; for maximum utility, when using this type of radiation, energy equivalent to at least 0.1 million electron volts (mev.) is preferred. Higher energies are even more effective; there is no known upper limit, except that imposed by available equipment.

The high energy particle radiation is an emission of highly accelerated electrons or nuclear particles such as protons, neutrons, alpha particles, deuterons, beta particles, or the like, directed so that the said particle impinges upon the polymer.

Similarly, ionizing electromagnetic radiation (X-rays) useful in the process of this invention is produced when a metal target (e.g., gold or tungsten) is bombarded by electrons possessing appropriate energy, e.g., 0.1 mev. In addition to X-rays produced as indicated above, ionizing electromagnetic radiation suitable for carrying out the process of the invention may be obtained from a nuclear reactor ("pile") or from natural or artificial radioactive material, for example, cobalt 60.

The does rate ("intensity" of dose) is not critical, being primarily a matter of available equipment. In general, high dose rates are preferred as promoting higher throughput.

Efficiency of dose utilization will usually be improved by keeping the fiber and excess monomer mixture in contact for an extended time after irradiation, with either the two-step or one-step process. This will provide maximum opportunity for the radical-initiated chains to grow.

Substrate shape.—The product of the instant invention may be grafted before or after converting to its final (i.e., filament) shape, where the modifier, such as vinyl pyridine, is sufficiently stable thermally to stand the temperatures required for melt spinning. When the fiber is grafted, it may be grafted before or after drawing. It may be grafted as yarn, staple, flock, tow or fabric of knitted, felted, or woven construction.

Substrates.—Substrates useful for the graft copolymer of this invention are the synthetic linear fiber-forming polyamides and polyesters. The polyamides are characterized by recurring amido radicals as an integral part of the polymer chain. The amido radicals are linked by divalent organic radicals which may be aliphatic, cycloaliphatic or aromatic, or mixtures of the above. Typical polyamides are poly(hexamethylene adipamide), polycaprolactam, poly(hexamethylene sebacamide), polyaminoundecanoamide, poly(hexamethylene isophthalamide), poly(2-methyl hexamethylene terephthalamide), poly(meta-xylylene adipamide), poly(para-xylylene sebacamide), poly(octamethylene oxalamide), and the polyamide from bis(40 aminocyclohexyl) methane and sliphatic acids such as dodecanedioic acid. Copolymers having two or more components, as well as polymer and copolymer mixtures of the above are also included.

In addition to the polyamides, the invention is especially applicable to the crystallizable, linear condensation polyesters. These comprise linear polyesters containing in the polymer carbonyloxy linking radicals

Polymers containing oxycarbonyloxy radicals are comprehended with this group. The polymers should be of fiber-forming molecular weight; usually, this implies a relative viscosity of about 10 or higher as conventionally measured in solution in a solvent for the polymers. A good solvent for most of the linear condensation polyesters is a mixture of 58.8 parts of phenol and 41.2 parts of trichlorophenol. Copolyesters, terpolyesters, and the like are intended to be comprehended within the term "polyesters."

Examples of crystallizable, linear condensation polyesters include polyethylene terephthalate, polyethylene terephthalate/isophthalate (85/15), polyethylene terephthalate/5-(sodium sulfo) isophthalate (97/3), poly(p-hexahydroxylylene terephthalate), polyhydroxypivalic acid, poly(decahydronaphthalene - 2,6-dimethylene-4,4,-bibenzoate), polyethylene 2,6- or 2,7-naphthalenedicarboxylate, and poly(bicyclohexyl-4,4'-dimethylene-4,4'-bibenzoate), as well as many others. Preferably, the polyester is a linear glycol terephthalate polyester. By this is meant a linear condensation polyester derived from a glycol and an organic acid in which the glycol component is comprised substantially of a dihydroxy compound of a divalent saturated hydrocarbon radical containing from 2 to 10 carbon atoms and the acid component is at least about 75 mol percent terephthalic acid.

Utility.—The graft copolymers bearing amine groups according to this invention have improved dyeability, especially when using acidic dyes. Especially in the quaternized form, they have reduced static propensity as compared to unmodified polymer, and in addition are more wickable, i.e., they absorb water more rapidly. They also resist soiling with dry and oily soil. They have a plurality of reactive sites which are available as points of attachment for permanent modifying agents.

What is claimed is:
1. An acid-dyeable shaped article of substrate of a synthetic linear condensation polymer of a polyamide wherein the recurring amide linkages are an integral part of the polymer chain or polyester wherein the recurring ester linkages are an integral part of the polymer chain which is free from aliphatic unsaturation and bearing a basic amine compound grafted substantially throughout the substrate to the extent of from 45 to 3000 equivalents of amine groups per $10^6$ gms. of the said polymer substrate, the said amine compound being linked to the said substrate via carbon-carbon bonds.

2. An acid-dyeable shaped article as defined in claim 1 where said basic amine compound is vinyl pyridine or lower alkyl substituted vinyl pyridine.

3. An acid-dyeable shaped article as defined in claim 1 where said basic amine compound is a quaternized amine.

4. An acid-dyeable shaped article as defined in claim 1 where said basic amine compound is an unsaturated amine.

5. An acid-dyeable shaped article as defined in claim 1 where said basic amine compound is hexamethylene diamine.

No references cited.

SAMUEL H. BLECH, *Primary Examiner.*

PAUL LIEBERMAN, *Assistant Examiner.*

U.S. Cl. X.R.

204—159.15; 260—78.3, 873, 874